United States Patent [19]
Lizenby

[11] 4,359,175
[45] Nov. 16, 1982

[54] ADJUSTABLE VIBRATING POWDER DISPENSING ASSEMBLY

[75] Inventor: Kevin J. Lizenby, Traverse City, Mich.

[73] Assignee: Kelsey-Hayes Company, Romulus, Mich.

[21] Appl. No.: 207,017

[22] Filed: Nov. 14, 1980

[51] Int. Cl.$^3$ .............................................. A01C 3/06
[52] U.S. Cl. .................................... 222/199; 222/200
[58] Field of Search ............... 222/196, 199, 200, 161, 222/409, 197, 164; 239/102, 451, 455, 659; 406/75

[56] References Cited

U.S. PATENT DOCUMENTS

| | | | |
|---|---|---|---|
| 2,533,331 | 12/1950 | Skinner | 406/75 |
| 3,058,621 | 10/1962 | Stenzel | 222/200 |
| 3,297,203 | 1/1967 | Wahl | 222/196 |
| 3,568,894 | 5/1971 | Allen | 222/199 |
| 3,972,449 | 8/1976 | Smith | 222/197 |

*Primary Examiner*—David A. Scherbel
*Attorney, Agent, or Firm*—McGlynn and Milton

[57] ABSTRACT

A powder dispensing assembly including support structure defined by spaced end plates interconnected by a top plate with a purality of openings therein for passing particles therethrough. A Y-shaped chute has its upper extremities connected to the edges of the top plate and parallel lower extremities defining an outlet opening. A tubular receptacle is supported at each end on stud shafts extending from the end plates. The receptacle has a rear wall and a bottom wall extending from the rear wall to a lip over which the particles of powder move to define a falling curtain of powder particles. A bar extends between the end walls of the receptacle above the bottom wall to establish a gap between the bottom wall and the bar, the outlet of the chute being between the bar and the rear wall of the receptacle. A rod extends through one stud shaft at one end of the assembly and threadedly engages the receptacle for vibrating the receptacle rectilinearly in a direction parallel to the lip. The angular position of the receptacle may be adjusted by a lever extending radially of the rod and biased against an adjustable set screw.

9 Claims, 5 Drawing Figures

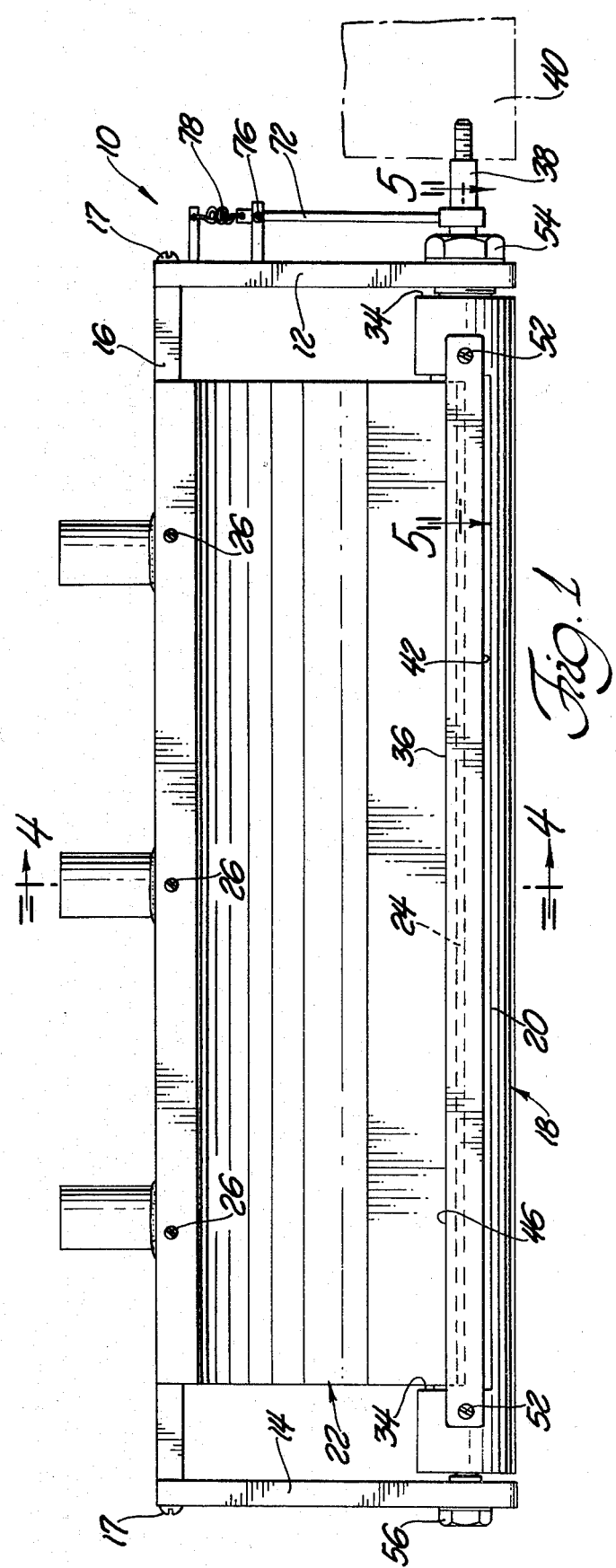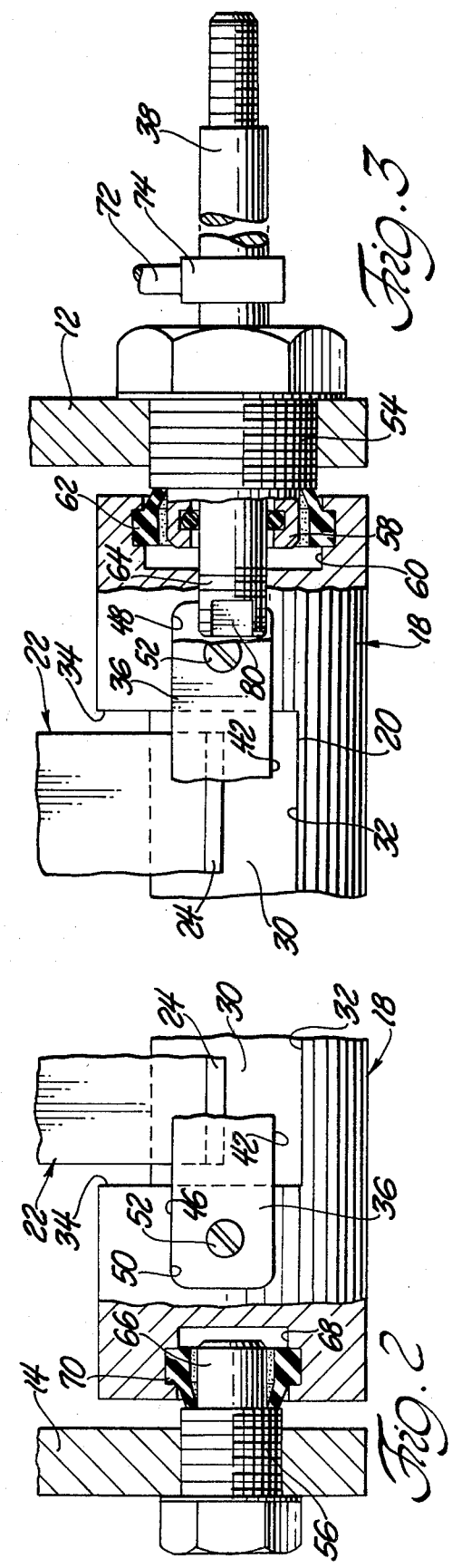

ADJUSTABLE VIBRATING POWDER DISPENSING ASSEMBLY

BACKGROUND OF THE INVENTION (1) Field of the Invention

The powder dispensing assembly of the subject invention is utilized to dispense a curtain of falling powder particles at a controlled and precise rate. Although not limited thereto, the subject invention is particularly suitable for use in the processing of powder metal particles. In the processing of powder metal particles, the particles are frequently classified according to size. One manner in which this is accomplished is to establish a curtain of falling particles which fall into a horizontally moving stream of gas which establishes short trajectories for the heavier particles and long trajectories for the lighter particles so that the particles fall into classification compartments. The subject invention is particularly useful for dispensing such a curtain of falling powder particles.

(2) Description of the Prior Art

There are known in the prior art dispensing assemblies which dispense particles. Specifically, there are known in the prior art dispensing assemblies wherein a platform is supplied particles and vibrated to move the particles to an edge or lip over which they fall. The problem with the prior art dispensing assemblies is that there are none available which very precisely dispense a controlled amount of particles in a controlled manner and which can precisely control the termination of particles dispensing so as to prevent spillage, or the like.

SUMMARY OF THE INVENTION

A powder dispensing assembly constructed in accordance with the subject invention comprises support structure with dispensing means movably supported by the support structure for receiving powder and having a lip over which particles of powder move to define a falling curtain of powder particles and supply means for establishing a flow path and supplying powder particles to the dispensing means. The dispensing means defines an elongated receptacle for receiving powder particles from the supply means with the receptacle having a rear wall and a bottom wall extending from the rear wall to the lip and end walls at opposite ends of the bottom and rear walls. The receptacle includes flow control means extending between the end walls above the bottom wall to establish a gap between the bottom wall and the flow control means and drive means for vibrating the receptacle rectilinearly and parallel to the lip so that the walls and flow control means vibrate in unison to dispense particles through the gap and over the lip.

PRIOR ART STATEMENT

As alluded to the above, there are known in the prior art dispensing assemblies which include a vibrating platform which vibrates to move powder to an edge or lip over which the powder falls. Such an assembly is shown in U.S. Pat. No. 949,400 granted Feb. 15, 1910 to J. M. McAfee wherein a platform is moved rectilinearly back and forth in a direction parallel to the falling particles and is fed particles from a chute which forms a gap with the platform. The prior art, however, does not teach the subject concept wherein a receptacle receives a supply of powder and has a flow control means extending between the ends of the receptacle and spaced above the bottom to vibrate in unison with the receptacle rectilinearly in a direction parallel to the lip.

BRIEF DESCRIPTION OF THE DRAWINGS

Other advantages of the present invention will be readily appreciated as the same becomes better understood by reference to the following detailed description when considered in connection withe accompanying drawings wherein:

FIG. 1 is a front elevational view of the subject assembly;

FIG. 2 is an enlarged fragmentary cross-sectional view taken from the front of the assembly showing the support of the receptacle at one end;

FIG. 3 is an enlarged fragmentary cross-sectional view taken from the front of the assembly at the other end to show the support of the receptacle;

DESCRIPTION OF THE PREFERRED EMBODIMENT

Figure 4:
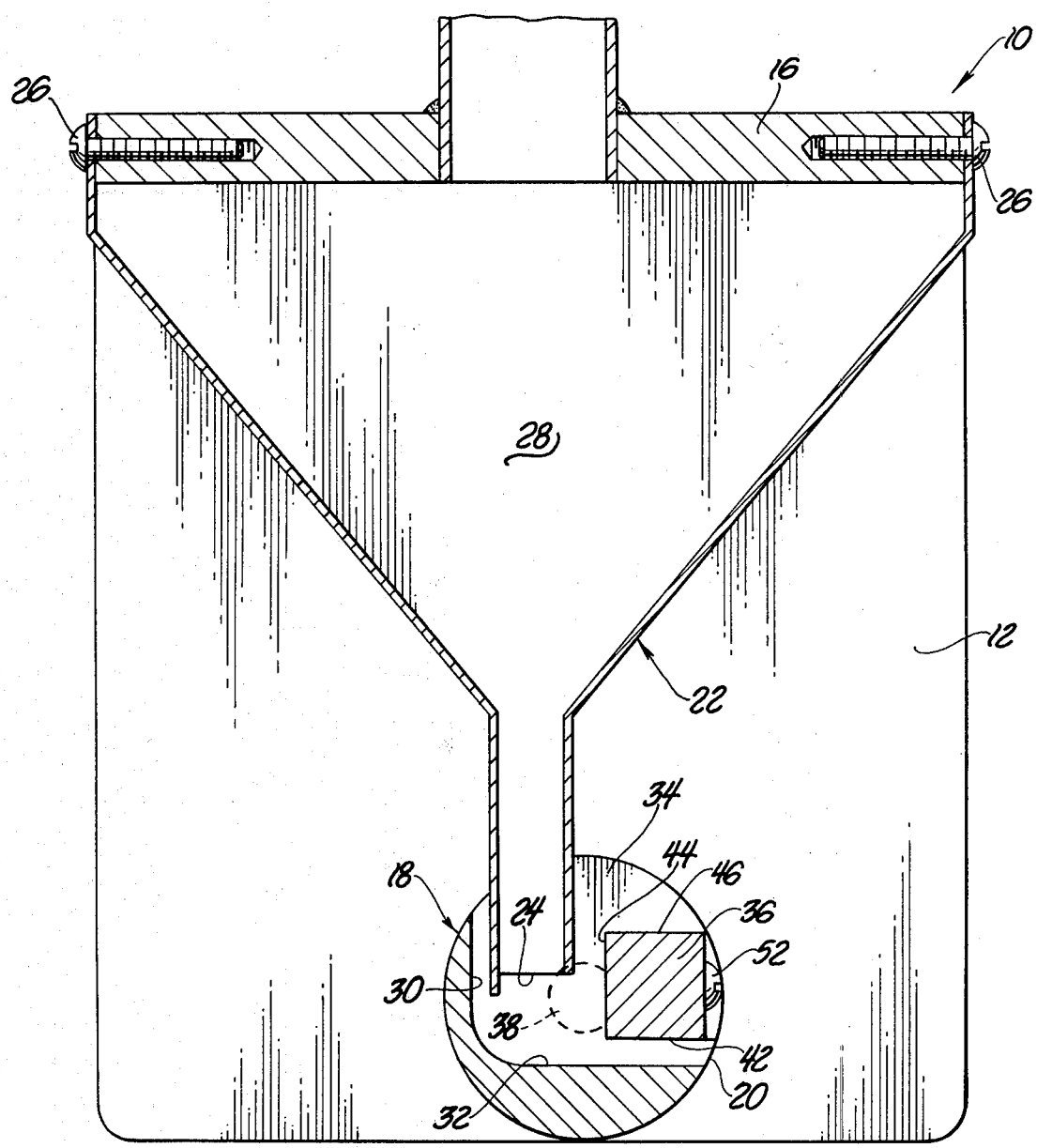
FIG. 4 is an enlarged cross-sectional view taken substantially along line 4—4 of FIG. 1.

A powder dispensing assembly constructed in accordance with the subject invention is generally shown at 10.

The assembly 10 includes a support structure defined by first and second spaced end plates 12 and 14 and a top plate 16 extending between the top or upper extremities of the end plates 12 and 14. The end plates 12 and 14 are connected to the ends of the top plate 16 by bolts 17 which threadedly engage the ends of the top plate 16. A plurality of tubes are secured to the top plate 16 to define inlet openings for passing articles therethrough.

The assembly 10 includes dispensing means generally indicated at 18 and movably supported by the end plates 12 and 14 of the support structure for receiving powder and having or defining a lip 20 over which particles of powder move to define a falling curtain of powder particles.

The assembly 2 also includes powder supply means for establishing a flow path and supplying powder particles to the dispensing means 18, the supply means being generally indicated at 22. The supply means 22 is defined by an elongated chute supported by the top plate 16 of the support structure and having an elongated outlet opening 24. The chute is Y-shaped with sides having upper diverging extremities attached to the side edges of the top plate 16 by fastening bolts 26. The sides of the chute have parallel lower extremities spaced apart to define the outlet 24 with the rear side extending below the opening 24. The sides of the chute are interconnected by ends, one of which is shown at 28 in FIGS. 4 and 5.

The dispensing means 18 is defined by an elongated cylindrical receptacle for receiving powder particles from the supply means 22. The cylindrical receptacle defines a rear wall 30 and a bottom wall 32 extending forwardly from the rear wall 30 to the lip 20 with end walls 34 at the opposite ends of the bottom and rear walls 30 and 32.

The dispensing means 18 defined by the cylindrical receptacle includes flow control means defined by the bar 36 extending between the end walls 34 above the bottom wall 32 to establish a gap between the bottom wall 32 and the bar 36 to the flow control means.

The assembly 10 also includes a drive means including the rod and a vibrator or oscillator 40 shown in phantom in FIG. 1 for vibrating the receptacle defining the dispensing means 18 rectilinearly and in a direction parallel to the lip 20 so that the walls 30, 32 and 34 and the bar 36 of the flow control means vibrate in unison to dispense particles through the gap and over the lip 20.

The bar 36 defining the flow control means is elongated and has a bottom surface 42 defining the upper extremity of the gap and a back surface 44 spaced from the rear wall 30 of the receptacle and, in addition, spaced toward the rear wall 30 of the receptacle from the lip 20. In other words, the back surface 44 of the bar 36 is spaced rearwardly of the lip 20 and although the back surface 44 is closer to the lip 20 than it is to the rear wall 30, it is closer to the mid point between the lip 20 and the rear wall 30 than it is to the lip 20.

Figure 5:
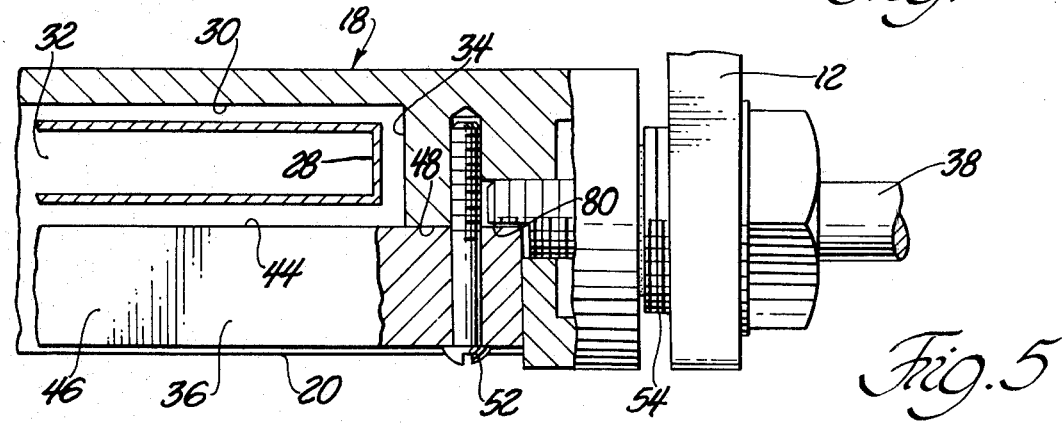
FIG. 5 is an enlarged cross-sectional view taken substantially along line 5—5 of FIG. 1.

The chute defining the supply means 22 is elongated and the outlet opening 24 defined thereby is disposed between the rear wall 30 of the receptacle and the rear surface 44 of the bar 36. The outlet opening 24 is spaced above the bottom wall 32 and below the upper extremity of the rear surface 44 of the bar 36, which upper extremity is defined by the upper surface 46 of the bar 36. The bar 36 is generally rectangular and, more specifically, square in cross-sectional configuration. A first end of the receptacle 18 includes a first recess 48, as shown in FIGS. 3 and 5, extending thereinto and opening into or through the first end wall 34. Similarly, the second end of the receptacle 18 includes a second recess 50, as shown in FIG. 2, extending thereinto and opening through the second or other end wall 34. The elongated bar 36 has a first end disposed in the first recess 48 and a second end disposed in the second recess 50 and threaded fasteners 52 extend through each end of the bar 36 and threadedly engage the ends of the receptacle in the respective recesses 48 and 50. By the use of shims between the rear surface 44 of the bar 36 and the bottom of the recesses 48 and 50, the horizontal or fore and aft position of the bar 36 may be adjusted to change the distance the back surface 44 is positioned from the lip 20. Of course, other suitable means may be employed to adjust the position of the bar 36.

The spaced end plates 12 and 14 of the support structure are adjacent the ends of the receptacle 18. A first stud shaft assembly 54 interconnects the first end plate 12 and the first end of the receptacle 18. There is also a second stud shaft assembly 56 interconnecting the second end plate 14 and the second end of the receptacle 18 for allowing the rectilinear and angular movement of the receptacle 18 relative to the support structure defined by the plates 12, 14 and 16. More specifically, the first stud shaft assembly 54 includes a first stud shaft 58 extending from the first end plate 12 and into a first cavity 60 in the first end of the receptacle 18. A first wiper ring 62 is disposed in an annular groove in the cavity 60 and engages the first stud shaft 58 for interconnecting the receptacle 18 and the first stud shaft 58. The stud shaft assembly 54 comprises a threaded portion threadedly engaging the end plate 12 and an end portion which may be engaged by an appropriate wrench for rotating the assembly 54. The stud shaft 58 extends from the threaded portion of the assembly.

The rod 38 extends through the first stud shaft assembly 54 to a threaded connection 64 with the first end of the receptacle 18 for moving the receptacle 18 relative to the plates 12, 14 and 16 of the support structure. The stud shaft assembly 54 has a cylindrical passage therethrough through which the rod 38 extends and an O-ring is disposed between the interior of the stud shaft portion 58 and the rod 38. The outward end of the rod 38 is also threaded for engaging an appropriate vibrator 40.

The second stud shaft assembly 56 includes a second stud shaft 66 extending from the second end plate 14 and into a second cavity 68 in the second end of the receptacle 18. Second wiper ring 70 is disposed in the second cavity 68 and engages the second stud shaft portion 66 for interconnecting the receptacle 18 and the second stud shaft 66. The stud shaft assembly 56 is a solid fitting member having a threaded portion threadedly engaging the end plate 14 and a head portion for being engaged by an appropriate wrench.

The assembly 10 also includes an adjustment means for adjusting the angular position of the receptacle 18 about its longitudinal axis extending between the end walls 34 thereof. More specifically, the longitudinal axis extends axially through the stud shafts 58 and 66 whereby the receptacle 18 may be rotated angularly about the axis which extends centrally through the shafts 58 and 66. The adjustment means includes a lever arm 72 extending radially from the rod 38 on the outside or opposite side of the end plate 12 from the receptacle 18. The lever 72 may be secured to the rod 38 by an appropriate clamping portion 74. An adjustment screw 76 is threadedly supported by the first end plate 12 by a bracket or arm extending therefrom and engages the lever 72 to adjust the position of the lever to rotate the receptacle 18 angularly about the first and second stud shafts 58 and 66. There is also included biasing means comprising a spring 78 for urging the lever 72 against the adjustment screw 76. The spring 78 extends from an arm or lever extending from the end plate 12 to the upper extremity of the lever 72.

The rod 38 has a notch 80 in the threaded portion 64 thereof which threadedly engages the receptacle 18 with the notch 80 disposed about the first end of the bar 36 for preventing rotation of the rod 38 relative to the receptacle 18. Thus, upon rotation of the lever 72 fore and aft, as viewed in FIG. 1, the rod 38 may be rotated and, because of the notch 80, the receptacle 18 would be rotated about the axis of its support through the shafts 58 and 66. This adjustment affects the particle flow over the lip 20.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A powder dispensing assembly (10) comprising; support structure (12, 14, 16), dispensing means (18) movably supported by said support structure (12, 14, 16) for receiving powder and having a lip (20) over which particles of powder move to define a falling curtain of powder particles, supply means (22) for establishing a flow path and supplying powder particles to said dispensing means (18), said dispensing means (18)

defined by an elongated receptacle for receiving powder particles from said supply means (22), said receptacle (18) having a rear wall (30) and a bottom wall (32) extending from said rear wall (30) to said lip (20) and end walls (34) at opposite ends of said rear and bottom walls (30, 32), said assembly characterizdd by said receptacle (18) including flow control means (36) extending between said end walls (34) above said bottom wall (32) to establish a gap between said bottom wall (32) and said flow control means (36), drive means (38, 40) for vibrating said receptacle (18) rectilinearly and parallel to said lip (20) so that said walls (30, 32, 34) and said flow control means (36) vibrate in unison to dispense particles through said gap and over said lip (20) and adjustment means for adjusting the angular position of said receptacle (18) relative to said support structure (12, 14, 16) and about its longitudinal axis extending between said end walls (34) thereof.

2. An assembly as set forth in claim 1 wherein said flow control means (36) comprises an elongated bar (36) having a bottom surface (42) defining the upper extremity of said gap and a back surface (44) spaced from said rear wall (30) of said receptacle (18) and spaced toward said rear wall (30) of said receptacle (18) from said lip (20) and wherein said supply means (22) comprises an elongated chute supported by said support structure (16) and having an elongated outlet opening (24) disposed between said rear wall (30) of said receptacle (18) and said rear surface (44) of said bar (36).

3. An assembly as set forth in claim 2 wherein said outlet opening (24) is spaced above said bottom wall (32) and below the upper extremity (46) of said rear surface (44) of said bar (36).

4. An assembly as set forth in claim 3 wherein said support structure includes first and second spaced end plates (12, 14) adjacent the ends of said receptacle (18), a first stud shaft assembly (54) interconnecting said first end plate (12) and a first end of said receptacle (18) and a second stud shaft assembly (56) interconnecting said second end plate (14) and a second end of said receptacle (18) for allowing the rectilinear and angular movement of said receptacle (18) relative to said support structure (12, 14, 16).

5. An assembly as set forth in claim 4 wherein said first stud shaft assembly (54) includes a first stud shaft (58) extending from said first end plate (12) into a first cavity (60) in said first end of said receptacle (18) and a first wiper ring (62) disposed in said cavity (60) and engaging said first stud shaft (58) for interconnecting said receptacle (18) and said first stud shaft (58), said second stud shaft assembly (56) includes a second stud shaft (66) extending from said second end plate (14) into a second cavity (68) in said second end of said receptacle (18) and a second wiper ring (70) disposed in said second cavity (68) and engaging said second stud shaft (66) for interconnecting said receptacle (18) and said second stud shaft (66).

6. An assembly as set forth in claim 5 wherein said drive means includes a rod (38) extending through said first stud shaft assembly (54) to a threaded connection (64) with said receptacle (18) for moving said receptacle (18) relative to said support structure (12, 14, 16).

7. An assembly as set forth in claim 6 wherein said adjustment means includes a lever arm (72) extending radially from said rod (38) on the opposite side of said first end plate (12) from said receptacle (18), an adjustment screw (76) threadedly supported by said first end plate (12) and engaging said lever (72) to adjust the position of said lever (72) to rotate said receptacle (18) about said first (58) and second (66) stud shafts and biasing means (78) urging said lever (72) against said adjustment screw (76).

8. An assembly as set forth in claim 7 wherein said first end of said receptacle (18) includes a first recess (48) extending thereinto and opening through said first end wall (34) and said second end of said receptacle (18) includes a second recess (50) extending thereinto and opening through said second end wall (34), said elongated bar (36) having a first end disposed in said first recess (48) and a second end disposed is said second recess (50), a threaded fastener (52) extending through each end of said bar (36) and threadedly engaging said receptacle (18) in said respective recesses (48, 50), said rod (38) having a notch (80) in the end thereof and disposed about said first end of said bar (36) for preventing rotation of said rod (38) relative to said receptacle (18).

9. An assembly as set forth in claim 8 wherein said support structure includes a top plate (16) extending between said end plates (12, 14) said top plate (16) having at least one opening for passing particles therethrough, said chute (22) being Y-shaped with sides having upper extremities attached to the edges of said top plate (16) and parallel lower extremities defining said outlet opening (24).

* * * * *